United States Patent [19]

Lewellen et al.

[11] Patent Number: 4,657,499

[45] Date of Patent: Apr. 14, 1987

[54] SCREW EXTRUDER APPARATUS ADAPTED FOR MIXING ADDITIVE FLUIDS

[75] Inventors: Philip C. Lewellen; Jaime S. Son, both of Houston, Tex.

[73] Assignee: Shell Oil Company, Houston, Tex.

[21] Appl. No.: 739,572

[22] Filed: May 30, 1985

[51] Int. Cl.⁴ .............................................. B29B 7/42
[52] U.S. Cl. .................................. 425/208; 264/211; 264/349; 366/76; 366/90; 425/204
[58] Field of Search .................. 366/76, 75, 90, 168; 264/349, 211, 300, 52, 53; 425/200, 204, 205, 207, 208, 817 C, 376 R, 376 B

[56] References Cited

U.S. PATENT DOCUMENTS

| | | | |
|---|---|---|---|
| 2,719,325 | 10/1955 | Franklin | 264/349 |
| 3,160,688 | 12/1964 | Aykanian et al. | 264/53 |
| 3,193,877 | 7/1965 | Edwards | 366/75 |
| 3,199,147 | 8/1965 | Aykanian et al. | 428/380 |
| 3,222,797 | 12/1965 | Zies | 34/17 |
| 3,251,911 | 5/1966 | Hansen | 264/25 |
| 3,440,309 | 4/1969 | Breukink et al. | 264/53 |
| 3,444,283 | 5/1969 | Carlson, Jr. | 264/53 |
| 3,497,914 | 3/1970 | Tybout | 425/131.1 |
| 3,684,252 | 8/1972 | Nissle et al. | 366/168 |
| 3,817,675 | 6/1974 | Malocco | 264/349 |
| 3,832,431 | 8/1974 | Matthaei | 264/349 |
| 3,902,704 | 9/1975 | Ishibashi et al. | 366/79 |
| 4,015,828 | 4/1977 | Miles | 366/76 |
| 4,056,344 | 11/1977 | Lemelson | 425/380 |
| 4,065,532 | 12/1977 | Wild et al. | 264/68 |
| 4,155,690 | 5/1979 | Checkland et al. | 264/211 |

FOREIGN PATENT DOCUMENTS

| | | |
|---|---|---|
| 845834 | 3/1977 | Belgium . |
| 2167 | 5/1979 | European Pat. Off. . |
| 2645599 | 4/1977 | Fed. Rep. of Germany . |
| 2829746 | 9/1979 | Fed. Rep. of Germany . |
| 3013556 | 10/1980 | Fed. Rep. of Germany . |
| 2473361 | 7/1981 | France . |
| 160045A | 4/1983 | German Democratic Rep. . |
| 5028887 | 2/1980 | Japan . |
| 56-70931 | 6/1981 | Japan . |
| 2089282 | 6/1982 | United Kingdom . |

OTHER PUBLICATIONS

"Observations on the Flow Behavior in Twin Screw Extruders with Mixing Elements", Tadamoto Sakai, *Kobunshi Ronbunshu, vol. 38, No. 4, pp. 279-284 (1981)*.
"Extruder-Screw Design for Compounding", C. Y. Cheng, *Plastics Compounding*, Mar./Apr. 1981, pp. 29-40.
"Devolatilisation of Polymers in Multi-Screw Devolatilisers", Dr. Ing. Hans Werner, *German Plastics, Kunststoffe* 71 (1981) 1, pp. 10-14.
"Deformation and Breakup of Liquid Droplets in a Simple Shear Field", H. J. Karam et al., *I&EC Fundamentals*, vol. 7, No. 4, Nov. 1968, pp. 576-581.

*Primary Examiner*—Jay H. Woo
*Assistant Examiner*—Jill Fortenberry
*Attorney, Agent, or Firm*—Richard F. Lemuth

[57] ABSTRACT

A screw-type extrusion apparatus adapted for the extrusion of a viscous primary extrusion stock and particularly adapted for the mixing into said primary extrusion stock of an additive of lower viscosity, which comprises (a) an elongated barrel, (b) means for introducing the primary stock into an upstream end of said barrel, (c) means for discharging extrusion stock from a downstream end of said barrel, (d) a rotatable screw worm axially disposed within said barrel for advancing the primary stock from the upstream end of said barrel to the downstream end of said barrel, said screw having a screw root and affixed to said root at least two axially separated stages of helically threaded screw flights, and (e) an injector for introducing the additive into the barrel at an axial position intermediate to the two said stages of screw flights, said injector extending inward through said barrel wall and having an inlet external to said wall and an outlet positioned substantially at the surface of said screw root. The invention is particularly useful for the blending of low viscosity essentially immiscible additives such as cooling agents, reactive agents, devolatilizing agents or the like into high viscosity thermoplastic melts.

20 Claims, 9 Drawing Figures

SCREW EXTRUDER APPARATUS ADAPTED FOR MIXING ADDITIVE FLUIDS

BACKGROUND OF THE INVENTION

This invention relates to an extrusion apparatus, more particularly a screw type extrusion apparatus which is useful in the blending of low viscosity additives into high viscosity materials such as thermoplastic melts.

Extrusion devices are well known in the art for the processing of a wide range of materials. Of particular interest to this invention are extruders of the screw type, in which one or more screw worms rotate within a closely fitting peripheral barrel. Rotation of the screw applies shear forces to an extrusion stock and propels the stock continuously through one or more regions wherein it is compressed and compacted, heated, softened, metered, and/or worked. In one very common service, the screw extruder is applied to produce a uniform, continuous stream of a molten thermoplastic extrudate suitable for injection into a mold or extrusion through a die, or otherwise useful for materials forming or further processing.

In practice, screw extruders are also often called upon to serve a mixing function. It may be desired, for instance, to mix or blend one or more additives into the extrusion stock as it is passed through the extruder. In some cases, an extruder is dedicated to a mixing (or, equivalently, a compounding or blending) operation. In other cases, additives are introduced into the extruder which has a principal function other than mixing. This is often true of colorants, stabilizers, and the like which could be mixed with the extrusion stock in a separate mixing step, although at increased equipment and operating expense. In still other cases, the additive may be one which provides a critical contribution to the particular application of extrusion and is necessarily added directly to the extruder. In this regard, mention may be made of coolants blended into the extrusion stock in order to moderate the buildup of heat which is generated by friction in a viscous extrusion stock and which may lead to thermal degradation of the stock. Mention may also be made of devolatizing agents which are commonly applied to aid in the separation of volatile substances, e.g., residual solvents, which represent a purity or safety problem and/or which result in porosity, bubbles, blisters, and similar defects in a formed extrudate product.

Even though screw extruders are commonly applied for mixing, they are recognized in the art as being rather poorly suited to this function. This is particularly true of single-screw extruders in which a motion of the material through the extruder is substantially in a uniform (helical) direction, and there is little opportunity for volume blending. Multiple-screw extruders typically offer improved mixing, relative to single-screw extruders, but are still often less effective than would be desired. In essentially all applications of screw extruders, the high viscosity of the extrusion stock inhibits turbulent flow or diffusion which would contribute to mixing within the extrusion stock.

The principal object of this invention is a screw extrusion apparatus having enhanced capabilities for the mixing of the primary extrusion stock with one or more lower viscosity additives. It is further the object of this invention to provide improved mixing efficiency by a means which does not significantly increase the expense of extruder equipment or operation, or have adverse effect upon product quality. In this respect, methods conventionally applied to increase mixing efficiency of such an extrusion involve increased working of the extrusion stock, for instance through the use of a lengthened screw and barrel, and/or application of greater force to the screw rotation. Such approaches increase not only equipment costs and power requirements, but also residence time and temperature, and hence degradation, of the extrusion stock.

A critical feature of the apparatus of the invention is an injector for introduction of the additive through the barrel of the extruder and into the path of the primary extrusion stock. The injector extends through the barrel and inwardly into and substantially through the annular space provided for flow of the extrusion stock, to a point essentially at the surface of the screw shaft (or root). In prior art practice, it has been most common for screw extruders to be provided with provisions for the introduction of additives by means of a port or injector terminating at the barrel wall. One prior art disclosure, that of U.S. Pat. No. 4,155,690, describes a screw extruder for the production of crosslinked polyethylene, in which the cross-linking agent (dicumyl peroxide) is added to the polyethylene melt in the extruder through an injector which extends half way between the barrel wall and the screw root. This patent suggests that such a position of injection avoids pulsed back pressure on the dicumyl peroxide supply system.

SUMMARY OF THE INVENTION

This invention provides an extruder apparatus of the screw type which is particularly adapted for the extrusion of a viscous primary extrusion stock and for the simultaneous mixing into the said primary stock of an additive of lower viscosity. In brief summary, the invention is a screw extrusion apparatus which in its preferred embodiments comprises (a) an elongated barrel, (b) means for introducing the primary stock into an upstream end of said barrel, (c) means for discharging extrusion stock from a downstream end of said barrel, (d) a rotatable screw axially disposed within said barrel for advancing the primary stock from the upstream end of said barrel to the downstream end of said barrel, said screw having a screw root and affixed to said root at least two axially separated stages of helically threaded screw flights, and (e) an injector for introducing the additive into the barrel at an axial position intermediate to the two said stages of screw flights, said injector extending inward through said barrel wall and having an inlet external to said wall and an outlet positioned substantially at the surface of said screw root.

In terms of its application to a given extrusion stock, this apparatus comprises means for introducing the primary stock into the barrel at an upstream location. The barrel contains the stock as it is forced from this upstream end to the downstream end (discharging means) by rotation of the screw, or, more particularly, rotation of the helically threaded screw flight stages. The two stages of flights are discontinuous, providing clearance for the injector to penetrate through the barrel wall and extend to an outlet positioned substantially at the surface of the root of the screw.

With respect to the requirement of the invention that the injector for additive incorporation into the extrusion stock extend substantially to the surface of the screw root, it has been observed that the proximity of the injector outlet to the root surface is a critical factor in obtaining the desired high degree of mixing. Injection of the additive at the barrel wall is found to result in very poor mixing, with a large portion of the injected additive collecting in a layer at the barrel wall. Not only is mixing then incomplete, but the formation of this layer in turn causes slippage of the extrusion stock at the wall and an incomplete and nonuniform working of the stock. Injection of additive at a point further into the extruder, for instance, at a point half way from the barrel wall to the screw root may provide some improvement, although there still remains a tendency in operation for a significant portion of the additive to migrate outward to the barrel wall.

The downstream section of screw flight is a preferred, but not a critical, element of the invention, in the sense that in more general embodiments of the invention this downstream section of flight, i.e., that positioned at an axial position between the injector outlet and the discharge means, is suitably substituted by other mixing and/or propelling elements. Thus, in broader aspects, the invention comprises the elements designated (a), (b), and (c) as described above, together with an element (d) which is a rotatable screw worm axially disposed within said barrel for advancing the primary stock from the upstream end of the said barrel to the downstream end of said barrel, said screw having a screw root and affixed to said root at least one stage of helically threaded screw flight at an upstream axial position along the root and at least one stage of mixing/propelling element at a downstream axial position along the root, and an element (e) which is an injector for introducing the additive into the barrel at an axial position intermediate to the upstream screw flight stage and the downstream mixing/propelling element stage, said injector extending inward through said barrel wall and having an inlet external to said wall and an outlet positioned substantially at the surface of said screw root. As indicated, this mixing/propelling element is preferably a separate stage of helically threaded screw flight, but is also very suitably an array of pins, baffles, or the like extending radially from the root.

In particularly preferred embodiments of the invention, the screw root is circumferentially channeled or grooved at the axial position of the injector outlet. Particularly preferred are embodiments in which the injector extends into this channel, so that the injector outlet is positioned at the same location along the extruder root axis as the channel and is radially positioned at a distance from the screw axis which is equal to or less than the results of the surface of the root immediately adjacent to either side of the channel.

DESCRIPTION OF THE PREFERRED EMBODIMENTS

The invention is now described in more detail with particular reference to the attached drawings, which are intended to illustrate the features and operation of certain limited embodiments of the invention, but which are not intended to limit its broader scope. In the various Figures (unless otherwise indicated), like numerals are used throughout to designate like elements of the apparatus.

Figure 1:
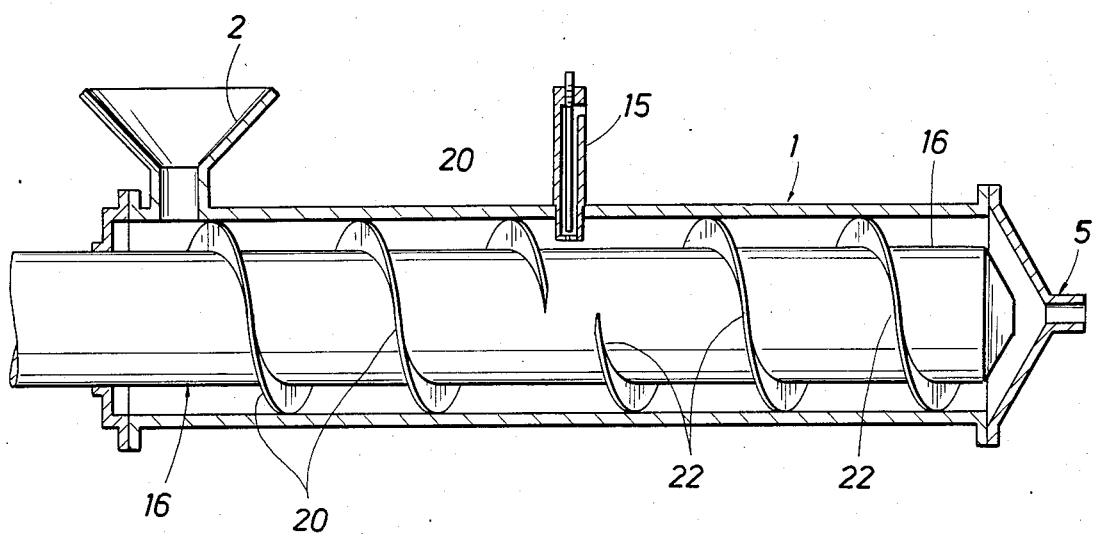
FIG. 1 is a side view of a screw-type extractor apparatus in accordance with the invention, in this case of a single screw apparatus, illustrating typical arrangement of the barrel, a screw worm with dual flights, a means for introduction of primary extrusion stock and for discharge of mixed extrusion stock, and an injector for introduction of an additive for mixing into the primary stock. The screw worm and its two stages of flights are shown in full relief, while the other elements are shown in sectional views through the axes of the barrel and the screw root, the injector, and the extrusion stock introduction means.
Figure 2:
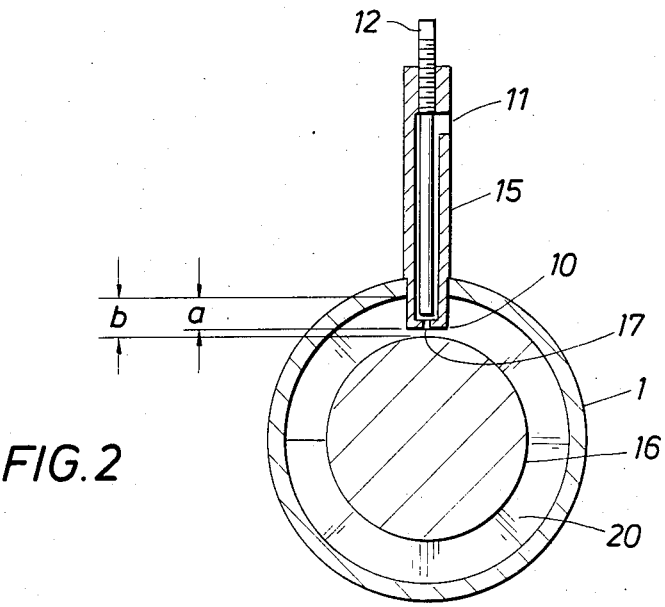
FIG. 2 is a cross-sectional view of the same apparatus, taken through the axis of the injector, illustrating in more detail the injector and its arrangement relative to other elements of the apparatus.

Attention is first directed to FIGS. 1 and 2, illustrating in simplified form certain features necessarily associated with single screw extruders, that is, an elongated barrel designated by the numeral 1, and a screw worm or, simply, screw. The screw includes a root, or shaft, 16 and, for the particular purposes of this invention, at least one upstream stage of helically threaded screw flight, designated 20, and at least one downstream stage of mixing/propelling element, here another screw flight section designated 22. Also shown are typical means for introducing primary extrusion stock into the barrel, in this case a hopper designated 2, as well as means for discharging worked extrusion stock from the extruder barrel, in this case a die designated 5. The injector for introduction of the low viscosity additive through the barrel at an axial location between the two screw flights is designated 15.

The screw worm is disposed within the barrel 1, the interior wall of which is cylindrical around the same axis as the cylindrical screw root. In the extruder shown, the two sections of screw flights 20 and 22 extend radially outward from the root substantially to the peripheral cylindrical barrel wall. The relative radial dimensions of screw root, screw flights and barrel wall are not critical to the invention. As is the case in conventional extruders, these dimensions will depend upon the characteristics of the extruder stock and upon the operation and desired function of the extruder. It is often the case that the dimensions of the screw root, of the flights and/or of the barrel will vary along their length.

In describing the invention, it is convenient to refer to the two sections of screw flights as the upstream flight, i.e., that designated 20 in FIG. 1, and the downstream flight (or, more broadly, mixing and/or propelling element), that designated 22 in FIG. 1, where the upstream and downstream directions have reference to the axial position of the injector and to the advance of extruder stock from the introduction means to the discharge means. In other words, the upstream flight is positioned along the screw root between the introduction means and the injector and the downstream screw, or, more generally, mixing/propelling element, is positioned between the injector and the discharge means.

The upstream flight is necessarily distinct and axially separated from the downstream mixing/propelling element in order to provide the clearance required for extension of the injector 15 substantially to the surface of the screw root. In FIG. 2, the injector is shown extending in a more or less radial direction inwardly through the barrel wall, from an inlet 11 external to the wall, and terminating at an outlet 17 immediately above the surface of the screw root. Rotation of the root and the helically-threaded flights (for instance, by a drive means not shown) forces extrusion stock through the extruder and past the injector.

Injector 15 penetrates the barrel wall to provide communication of the fluid additive from the external injector inlet 11 (and, in turn, from an additive source, e.g., a metering pump or like delivery means, not shown), into the extruder and, in operation into the bulk of the primary extrusion stock, through the injector outlet 17. In the detailed injector illustration provided by FIG. 2, the injector additionally comprises a valve means permitting control of the additive flow entering the extruder. The valve means consists of a stem 12 the lower terminus of which can be moved into contact against an annular valve seat 10 which also defines the injector outlet 17.

It is critical to the desired efficient mixing function of the extruder apparatus of the invention that the injector outlet be positioned substantially at the surface of the screw root. In preferred embodiments, the injector is terminated in an outlet which is positioned essentially as close to the surface of the root as is permitted by equipment design considerations, including, for example, allowances made for thermal expansion of the injector and the screw root, wobble of the root during rotation, and flow of the injected fluid additive from the outlet. Generally, the extension of the injector into the extruder to an outlet which is positioned substantially at the surface of the screw root will mean that the outlet is positioned at least about 75% of the radial distance from the interior barrel wall to the surface of the screw root. With particular reference to FIG. 2, this is illustrated by a distance shown as "a" which is at least about 75% of the distance shown as "b". Preferably, the injector outlet will be positioned at a point at least about 80% of the radial distance from the barrel wall to the surface of the screw root, while an extension of the injector outlet at least about 85% of this radial distance is considered most preferred.

Figure 3:
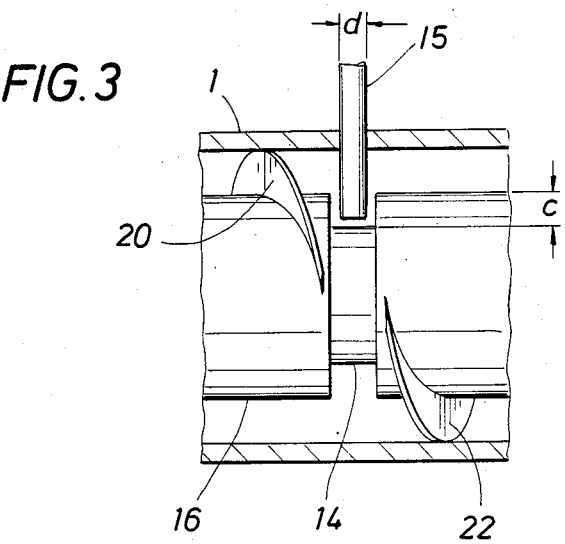
FIGS. 3, 5, and 7 are simplified fragmentary sectional side views, through the axes of the injector and of the barrel and screw root, of several single screw extruders according to the invention, illustrating different orientations (radial and tangential to the rotation of the screw) of the injector. The apparatus is also shown (in FIGS. 3 and 7) with a channel root at the axial position of the injector.
Figure 4:
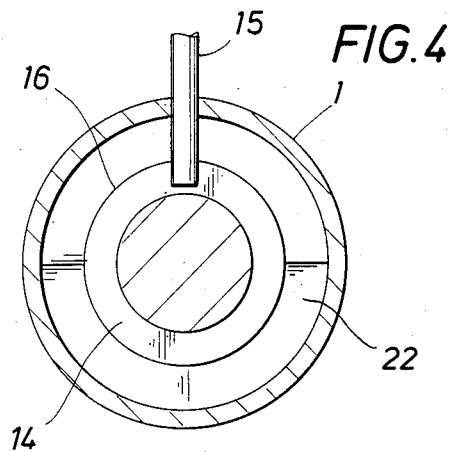
FIGS. 4, 6, and 8 are cross-sectional views through the axis of the injector, of extruder embodiments corresponding to FIGS. 3, 5, and 7, respectively.

FIGS. 3–8 illustrate fragmentary side sectional and cross sectional views of extruders according to the invention having different arrangements of the injector, and of the screw root at the locus of the injector outlet. FIGS. 3 and 4 are views of a preferred extruder apparatus wherein the screw root is channeled at the locus of the injector. A circumferential channel or groove is cut into the root leaving a section of the root 14 which is characterized by a reduced radius relative to the radius of the root immediately upstream or downstream of the channel. The depth of the channel, i.e., the dimension "c" in FIG. 3, is not critical to the invention. However, preference exists for a channel depth which is at least as great as the diameter of the injector extending into the barrel, i.e., the dimension "d" in FIG. 3. (For a non-cylindrical injector, this dimension d is the width of the injector perpendicular to the direction of flow of extrusion stock.) More preferably, the channel depth c is at least about twice the diameter of the extension of the injector within the wall. In the apparatus shown, there is also depicted a further preferred aspect of the invention in which the injector extends into the channeled section of the root, that is, it extends inward to an outlet 17 positioned at a distance from the screw axis which is less than the radius of the root surface immediately adjacent to either side of the channel (i.e., upstream or downstream of the channel).

Figure 5:
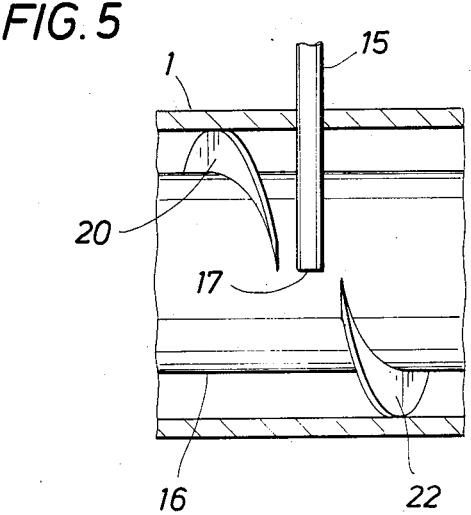
Figure 6:
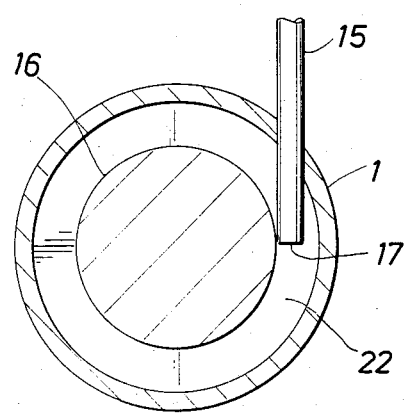

In each of the extruders depicted in FIGS. 1–4, the injector outlet directs flow of additive therethrough and into the bulk primary extrusion stock in a radial direction. If desired, the injector outlet is very suitably positioned to provide another path for flow of the additive. In this respect, it is generally suitable for the outlet to be positioned so that the additive flow has any combination of radial (inward, toward the axis) and/or circumferential and/or axial components. As an example, FIGS. 5 and 6 illustrate, in side and cross sectional view, an injector arrangement in which the injector extends more or less radially inward to an outlet 17 providing tangential injection of fluid additive into and along with the direction of flow of the primary extrusion stock. In the embodiment shown, the injector outlet directs flow of additive in a path which is tangential to the rotation of the screw root. Such a tangential path has been found to be of particular advantage to operation of the invention, from the standpoint of efficient mixing of the injected additive into the primary extrusion stock.

Figure 7:
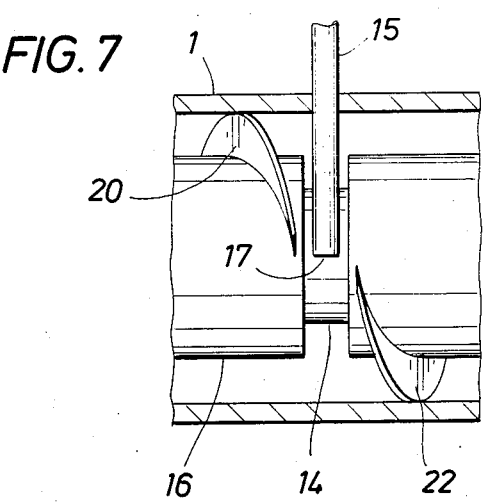
Figure 8:
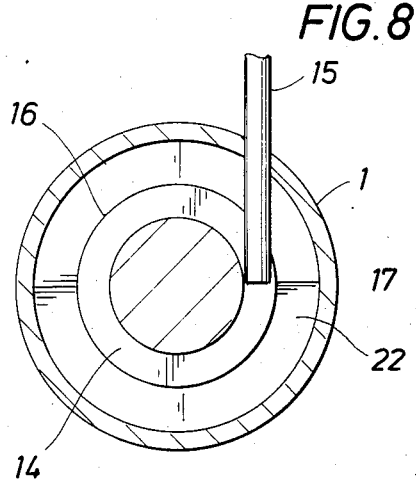

FIGS. 7 and 8 illustrate an extruder apparatus which combines the channeled root section, as depicted in FIGS. 3 and 4, with the injector outlet positioned to provide tangential flow of the additive therethrough, as depicted in FIGS. 5 and 6. In this particularly preferred embodiment, the injector extends to an outlet which is positioned within the channel.

The invention is equally suited to extruders having a single screw worm or to those having multiple screw worms. In the case of multiple screw worms, the worms may either have intermeshing or nonintermeshing flights. The suitability of multiple worms is, of course a different aspect of the invention than the specification of preferred embodiments wherein at least one of the screw worms has at least two separated sections of flights to provide clearance for injector positioned intermediate to the two flights.

Figure 9:
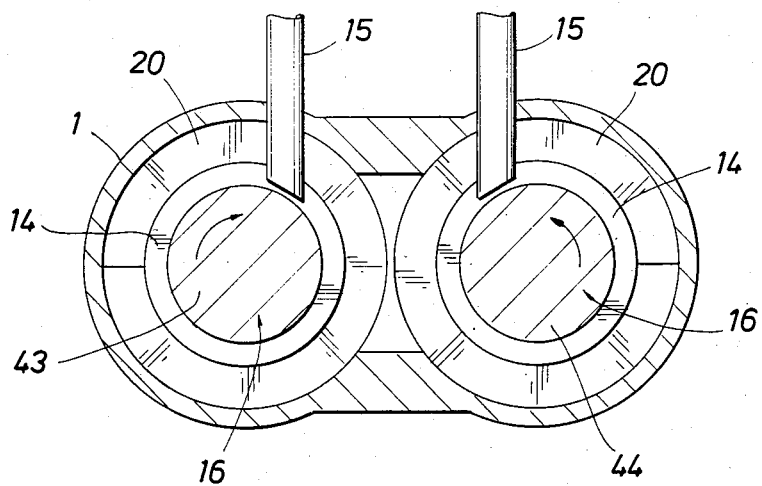
FIG. 9 is a cross-sectional view of an extruder according to the invention having two screw worms both with channeled roots. This apparatus is equipped with a pair of injectors, each extending into the channel provided in the root of one of the screws.

FIG. 9 depicts a cross sectional view of an extruder according to the invention having two screw worms 16, which are also given the independent designation of 43 and 44. The two worms are disposed parallel to each other, are laterally spaced so that the screw flights of one do not intermesh with the flights of the other, and are contained within a closely fitting peripheral barrel having two cylindrical lobes.

In the apparatus shown in FIG. 9, each of the screw worms is provided with a channeled root section, with an injector extending into the channel, and with sections of screw flights upstream and downstream of the injector location. Although the invention encompasses multiple screw worm extruders in which provision is made for additive injection at the root of less than all of the screw worms, this is not preferred for good mixing throughout the extrusion stock. Preferably, the extruder comprises an injector extending substantially to the root of each of the multiple worms, although in the case of worms with intermeshing flights it may be very suitable to apply a single injector with one or more outlets positioned between and substantially at the surface of each of two screw roots.

In addition to the elements shown in the Figures and described hereinabove, the invention may further comprise other elements, for instance, elements of conventional extruder designs which do not substantially interfere with operation of the apparatus of the invention. Such other elements may very suitably include those which also serve to enhance the mixing action within the extruder and/or those which satisfy some other object or function in extruder operation. In this respect, reference is made to conventional mixing devices for use in screw extrudes, including mixing pins, blister rings, and Maddock mixing sections affixed to the screw root. These and other suitable mixing devices are well known in the prior art, and are described, for example, in the publication of C. Y. Cheng, Extruder-Screw Design for Compounding, Plastics Compounding, March/April 1981, pp. 29-40. As one example of their application in this invention, an apparatus in accordance with the invention is characterized by an upstream section of the screw (that axially positioned between the introduction means and the injector) which comprises both a stage of screw flight and a blister ring, and by a downstream section (that axially positioned between the introduction means and the injector) which comprises a stage of screw flight, a stage of mixing pins, and a blister ring.

For illustration of particularly preferred arrangements of screw flights and other mixing/propelling elements along a screw worm, attention is directed to the commonly-assigned, copending application Ser. No. 739,573, filed on even date herewith. That application, entitled Mixing Element for Compounding and Extruding Machinery, describes an extrusion worm having an arrangement of mixing pins, for example three helical rows of pins arranged in a multiple start pattern on the screw root and within a screw flight stage. These pins also serve to enhance the mixing action within the extruder. The present invention very advantageously comprises a screw worm with mixing pins as described in the copending application, and the disclosure of that application relative to this and other adaptations of the extruder for improved mixing are incorporated herein by this reference.

Without intention that the invention be limited to one theory or mechanism of operation, it can be suggested that the enhanced mixing performance of the invention is attributable to preventing migration of the injected additive outward through the extrusion stock and to the barrel wall. Such migration has been observed to occur to a wake which tends to form in the extrusion stock along the downstream outer surface of the injector. This wake apparently serves as a path through which additive may run up, or radially outward, along the injector surface to the wall. However, when in accordance with the invention the injector outlet is positioned at the surface of the screw root, the root's rotation tends to pull additive away from the injector wake and into the bulk of the extrusion stock where effective mixing can take place. Forces acting to pull the additive away from the injector wake are increased by extension of the injector to an outlet in close proximity to the surface of the rotating root and, to an even greater extent, by extension into a channel cut into the root. Measures can also be taken in the design of an extruder in accordance with the invention to minimize forces acting to create and maintain a substantial wake downstream of the injector. In this context, the injector, in its extension between the barrel wall and the outlet, is preferably of a streamlined cross-section.

In application to the mixing of fluid streams, the invention provides for improved mixing of a fluid additive into a substantially fluid primary extrusion stock as it is passed through the screw extruder. Although operation of the apparatus of this invention does not center on the processing of any narrowly defined class of additives or primary stocks, certain characteristics of each of these materials, and also of the relationship of certain characteristics of one material to those of the other, are worthy of mention. For instance, the apparatus of the invention is very beneficially applied to the mixing of an additive into a primary extrusion stock in which it is immiscible. In another respect, the invention is very advantageously applied to the injection and mixing of additives having a low viscosity, relative to the primary stock (where the viscosity of the primary stock is measured immediately upstream of the point of additive injection). For example, very beneficial results are obtained in the mixing of materials having at least a tenfold difference in viscosities, and the invention is considered particularly useful in application to services in which the viscosity of the primary extrusion stock, at the point of injection of the additive, is preferably at least 100 times, or, more preferably, at least 1000 times that of the additive.

The difficulties associated with the blending of immiscible materials having substantial differences in viscosity are well recognized in the prior art. For example, H. J. Karam and J. C. Bellinger (I & EC Fundementals, vol. 7 (1968), No. 4, pp. 576-581) have conducted experiments attempting to disperse a low viscosity, immiscible liquid in a higher viscosity bulk liquid, and have reported that the breakup of larger droplets of the low viscosity liquid into smaller droplets, as is required for intimate mixing, is unlikely to take place when the viscosity of the relative viscosities of the two liquids differ by a factor of about 200 or more.

Perhaps the most common examples of primary extrusion stocks which are suitably processed in the apparatus of the invention are thermoplastic materials such as polymer melts, specifically including (but not limited to) such materials as cellulose acetate, cellulose acetate butyrate, ethyl cellulose, polyvinyl chloride, polystyrene, acrylic resins, vinylidene chloride resins, polyethylene, and nylons. The invention is however equally applicable to the extrusion and mixing of other viscous materials such as heavy oils, certain organic and inorganic pastes, flour and starch pastes and doughs, and the like. At the conditions at which the extruder is operated, for instance at the point of the injection of the additive, the primary stock typically has an absolute viscosity of about 50 poise or more. Viscosity of thermoplastic polymer melts during extrusion is typically between about 1000 and 10,000 poise.

Common examples of low viscosity additives suitable for injection into the primary stock using the apparatus of the invention include colorants, fillers, foaming agents, stabilizers, antioxidants, devolatizing or stripping agents, cooling agents, viscosity control agents, and reactive agents which induce chemical change in the primary stock, e.g., cross-linking in a polymer melt.

We claim as our invention:

1. A screw-type extrusion apparatus adapted for the extrusion of a viscous primary extrusion stock and particularly adapted for the mixing into said primary extrusion stock of an additive of lower viscosity, which comprises
   (a) an elongated barrel,
   (b) means for introducing the primary stock into an upstream end of said barrel,
   (c) means for discharging extrusion stock from a downstream end of said barrel,
   (d) a rotatable screw worm axially disposed within said barrel for advancing the primary stock from the upstream end of said barrel to the downstream end of said barrel, said screw having a screw root and affixed to said root at least two axially separated stages of helically threaded screw flights, and
   (e) an injector for introducing the additive into the barrel at an axial position intermediate to the two said stages of screw flights, said injector extending inward through said barrel wall and having an inlet external to said wall and an outlet positioned substantially at the surface of said screw root and directed for flow of injected additive tangential to the direction of rotation of the screw root.

2. The apparatus of claim 1, wherein the injector outlet is positioned at least about 75% of the radial distance from the interior barrel wall to the surface of the screw root.

3. The apparatus of claim 2, wherein the injector outlet is positioned at least about 80% of the radial distance from the interior barrel wall to the surface of the screw root.

4. The apparatus of claim 3, wherein the injector is positioned at least about 85% of the radial distance from the interior barrel wall to the surface of the screw root.

5. A screw-type extrusion apparatus adapted for the extrusion of a viscous primary extrusion stock and particularly adapted for the mixing into said primary extrusion stock of an additive of lower viscosity, which comprises
   (a) an elongated barrel,
   (b) means for introducing the primary stock into an upstream end of said barrel,
   (c) means for discharging extrusion stock from a downstream end of said barrel,
   (d) a rotatable screw worm axially disposed within said barrel for advancing the primary stock from the upstream end of said barrel to the downstream end of said barrel, said screw having a screw root and affixed to said root at least one stage of helically threaded screw flight at an upstream axial position along the root and at least one stage of an element for mixing or propelling at a downstream axial position along the roof, and
   (e) an injector for introducing the additive into the barrel at an axial position intermediate to the upstream screw flight stage and the downstream element stage, said injector extending inward through said barrel wall and having an inlet external to said wall and an outlet positioned substantially at the surface of said screw root and directed for flow of injected additive tangential to the direction of rotation of the screw root.

6. The apparatus of claim 5, wherein the injector outlet is positioned at least about 75% of the radial distance from the interior barrel wall to the surface of the screw root.

7. The apparatus of claim 6, wherein the injector outlet is positioned at least about 80% of the radial distance from the interior barrel wall to the surface of the screw root.

8. The apparatus of claim 7, wherein the injector outlet is positioned at least about 85% of the radial distance from the interior barrel wall to the surface of the screw root.

9. A screw-type extrusion apparatus adapted for the extrusion of a viscous primary extrusion stock and particularly adapted for the mixing into said primary extrusion stock of an additive of lower viscosity, which comprises
   (a) an elongated barrel,
   (b) means for introducing the primary stock into an upstream end of said barrel,
   (c) means for discharging extrusion stock from a downstream end of said barrel,
   (d) a rotatable screw worm axially disposed within said barrel for advancing the primary stock from the upstream end of said barrel to the downstream end of said barrel, said screw having a screw root and affixed to said root at least two axially separated stages of helically threaded screw flights, and said screw root having a circumferential channel at an axial position intermediate to the two stages of screw flights, and
   (e) an injector for introducing the additive into the barrel at the axial position of the channel in the screw root, said injector extending inward through said barrel wall and having an inlet external to said wall and an outlet positioned substantially at the surface of said screw root.

10. The apparatus of claim 9, wherein the injector outlet extends into the channel in the screw root.

11. The apparatus of claim 10, wherein the channel has a depth at least as great as the width of the injector.

12. The apparatus of claim 10, wherein the injector outlet is positioned at least 80% of the radial distance from the interior barrel wall to the surface of the screw root.

13. The apparatus of claim 9, wherein the injector outlet is directed for flow of injected additive tangential to the direction of rotation of the screw root.

14. The apparatus of claim 10, wherein the injector outlet is directed for flow of injected additive tangential to the direction of rotation of the screw root.

15. A screw-type extrusion apparatus adapted for the extrusion of a viscous primary extrusion stock and particularly adapted for the mixing into said primary extrusion stock of an additive of lower viscosity, which comprises
   (a) an elongated barrel,
   (b) means for introducing the primary stock into an upstream end of said barrel,
   (c) means for discharging extrusion stock from a downstream end of said barrel,
   (d) a rotatable screw worm axially disposed within said barrel for advancing the primary stock from the upstream end of said barrel to the downstream end of said barrel, said screw having a screw root and affixed to said root at least one stage of helically threaded screw flight at an upstream axial position along the root and at least one stage of an element for mixing or propelling at a downstream axial position along the root, and said screw root having a circumferential channel at an axial position intermediate to the upstream position of the at least one stage of screw flight and the downstream position of the at least one stage of said element, and (e) an injector for introducing the additive into the barrel at the axial position of the channel in the screw root, said injector extending inward through said barrel wall and having an inlet external to said wall and an outlet positioned substantially at the surface of said screw root.

16. The apparatus of claim 15, wherein the injector outlet extends into the channel in the screw root.

17. The apparatus of claim 16, wherein the channel has a depth at least as great as the width of the injector.

18. The apparatus of claim 16, wherein the injector outlet is positioned at least 80% of the radial distance from the interior barrel wall to the surface of the screw root.

19. The apparatus of claim 15, wherein the injector outlet is directed for flow of injected additive tangential to the direction of rotation of the screw root.

20. The apparatus of claim 16, wherein the injector outlet is directed for flow of injected additive tangential to the direction of rotation of the screw root.

* * * * *